(12) United States Patent
Uchida

(10) Patent No.: US 6,947,595 B2
(45) Date of Patent: Sep. 20, 2005

(54) SYSTEM FOR PROCESSING OBJECT AREAS OF AN IMAGE

(75) Inventor: Yoshiki Uchida, Newport Beach, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/725,528

(22) Filed: Dec. 3, 2003

(65) Prior Publication Data

US 2004/0109605 A1 Jun. 10, 2004

Related U.S. Application Data

(63) Continuation of application No. 09/458,938, filed on Dec. 10, 1999, now abandoned.

(51) Int. Cl.[7] .................................................. G06K 9/38
(52) U.S. Cl. ....................... 382/176; 382/171; 382/164; 382/199; 358/462
(58) Field of Search ................................ 382/173, 176, 382/175, 164, 166, 171, 199, 143; 358/462, 448, 443, 1.9, 3.24, 3.27, 518

(56) References Cited

U.S. PATENT DOCUMENTS

| | | | | |
|---|---|---|---|---|
| 5,296,939 A | | 3/1994 | Suzuki ....................... 358/453 |
| 5,361,147 A | | 11/1994 | Katayama et al. .......... 358/532 |
| 5,420,938 A | | 5/1995 | Funada et al. .............. 382/173 |
| 5,680,479 A | | 10/1997 | Wang et al. ................ 382/176 |
| 5,684,600 A | * | 11/1997 | Miyazaki et al. .......... 358/3.24 |
| 5,715,377 A | | 2/1998 | Fukushima et al. ......... 395/109 |
| 5,729,360 A | | 3/1998 | Kita et al. .................. 358/500 |
| 5,754,710 A | | 5/1998 | Sekine et al. ............... 382/300 |
| 5,767,978 A | | 6/1998 | Revankar et al. ........... 358/296 |
| 5,774,579 A | | 6/1998 | Wang et al. ................ 382/176 |
| 5,778,092 A | * | 7/1998 | MacLeod et al. ........... 382/176 |
| 5,787,196 A | | 7/1998 | Yair et al. .................. 382/178 |
| 5,825,944 A | | 10/1998 | Wang ......................... 382/309 |
| 5,844,688 A | | 12/1998 | Shimizu et al. ............. 358/296 |
| 5,848,186 A | | 12/1998 | Wang et al. ................ 382/176 |
| 5,854,854 A | * | 12/1998 | Cullen et al. ............... 382/176 |
| 6,275,615 B1 | * | 8/2001 | Ida et al. .................... 382/232 |
| 6,275,625 B1 | | 8/2001 | Bergmann et al. ............ 385/18 |
| 6,307,962 B1 | * | 10/2001 | Parker et al. ............... 382/170 |
| 6,356,655 B1 | * | 3/2002 | Sumikawa et al. ......... 382/175 |

FOREIGN PATENT DOCUMENTS

EP    0 662 765    7/1995    ............ H04N/1/62

* cited by examiner

*Primary Examiner*—Kanjishai Patel
*Assistant Examiner*—Ali Bayat
(74) *Attorney, Agent, or Firm*—Fitzpatrick, Cella, Harper & Scinto

(57) ABSTRACT

An image processing system utilizing block selection processing. According to the system, pixel data of an image is input and block selection processing is performed on the input pixel data to determine types of pixels within the image. It is then determined, based on the block selection processing, if a pixel is in an object area of the image and, if the pixel is determined to be in an object area of the image, the pixel is processed. Such processing may include detecting a proximity of the pixel to an edge, detecting a chromaticity of the pixel and detecting a width of a character in which the pixel is included.

12 Claims, 5 Drawing Sheets

SYSTEM FOR PROCESSING OBJECT AREAS OF AN IMAGE

This application is a continuation of application Ser. No. 09/458,938, filed Dec. 10, 1999, now abandoned.

BACKGROUND OF THE INVENTION

1. Field of the Invention

The present invention relates to systems for processing pixel data. More specifically, the present invention concerns image processing systems in which input pixel data is processed based on detected characteristics of the pixel data.

2. Incorporation by Reference

Commonly-assigned U.S. patent applications Ser. No. 07/873,012, now U.S. Pat. No. 5,680,479, entitled "Method and Apparatus For Character Recognition", Ser. No. 08/171,720, now U.S. Pat. No. 5,588,072, entitled "Method and Apparatus For Selecting Text And/Or Non-Text Blocks In A Stored Document", Ser. No. 08/338,781, entitled "Page Analysis System", Ser. No. 08/514,250, now U.S. Pat. No. 5,774,579, entitled "Block Selection System In Which Overlapping Blocks Are Decomposed", Ser. No. 08/514,252, now U.S. Pat. No. 5,848,186, entitled "Feature Extraction System", Ser. No. 08/664,674, entitled "System For Extracting Attached Text", Ser. No. 08/751,677, entitled "Page Analysis System", Ser. No. 08/834,856, now U.S. Pat. No. 5,825,944, entitled "Block Selection Review and Editing System", Ser. No. 09/002,684, entitled "System For Analyzing Table Images", Ser. No. 09/161,716, entitled "Color Block Selection", and Ser. No. 09/222,860, entitled "Block Selection Of Table Features", are herein incorporated as if set forth in full.

DESCRIPTION OF THE RELATED ART

Conventional image processing systems such as a color copier obtain pixel data by scanning an original document, and perform various image processing steps on the data to produce output data suitable for delivery to a laser beam reproduction engine, an ink jet reproduction system, or the like. In particular, conventional image processing systems, such as that in U.S. patent application Ser. No. 08/954,226 (hereinafter referred to as CFM 595 US), entitled "Image Processing Apparatus And Method", first receive red (R), green (G) and blue (B) signals representing a scanned image from a charge-coupled device (CCD). The received signals are then subjected to image processing.

FIG. 1 is a diagram illustrating such image processing. As shown in FIG. 1, image signals output from a CCD are input to analog signal processing unit 101, wherein the signals are processed with gain and offset adjustment. Next, each of the R, G and B signals is converted into an 8-bit digital image signal, R1, G1, and B1, respectively, by A/D converter 102. These signals are then input to shading correction circuit 103 for application of shading correction to each signal. Line delay circuits 104 and 105 are used to compensate for spacing of sensors within the CCD so as to match timing between each of the R1, G1 and B1 signals such that, after line delay circuit 105, values of the R, G and B signals at a same point in time represent a same pixel.

Input masking unit 106 converts a reading color space, determined by color decomposition characteristics of the CCD, into a standard color space, and log converter 107 converts luminance signals R4, G4 and B4 into density signals C0, M0 and Y0. The density signals are delayed by line delay memory 108 until determination signals UCR (under color removal), FILTER and SEN can be generated as described below.

After delay of the signals by line delay memory 108, masking UCR circuit 109 extracts black signals from the density signals using the UCR signal and variable magnification circuit 110 expands and compresses an image signal and a black character determination signal in the main scanning direction. Space filter processing unit 111 performs filtering using the FILTER signal and the resulting frame-sequential image signals M4, C4, Y4 and Bk4 are sent to reproduction engine 112 along with the SEN signal, which determines the resolution at which the image is output.

According to Application No. (CFM 595 US), the foregoing UCR, FILTER and SEN signals are output from black character determination unit 113. Specifically, the UCR signal generated by black character determination unit 113 has a value from 0 to 7 indicating, from more black to less black, an amount of black component which should be removed from signals Y1, M1 and C1 by masking UCR circuit 109 to produce signal Bk2. The FILTER signal produced by black character determination unit 113 is a 2-bit value in which values 0, 1, 2 and 3 indicate smoothing, strong edge enhancement, medium edge enhancement, and weak edge enhancement, respectively. Accordingly, the FILTER signal is input to space filter processing unit 111 to control an amount and type of filtering applied to signals Y3, M3, C3 and Bk3.

The SEN signal is output from black character determination unit 113 to reproduction engine 112, and is a 1-bit signal in which a 0 value indicates to engine 112 that printing should proceed at 200 lines per inch resolution, and the value 1 indicates that 400 lines per inch printing is required.

The values of UCR, FILTER and SEN are outputs of look-up table (LUT) 117, which receives signals indicating a width of a character containing a subject pixel, a proximity of the subject pixel to an edge of a character, and a chromaticity of the subject pixel. Therefore, the output values of UCR, FILTER, and SEN are calculated for each subject pixel and are determined based on a detected character width, edge proximity and chromaticity corresponding to the pixel according to relationships specified by the LUT.

For example, a FILTER signal value of 1 is used for a subject pixel which is located near to an edge, has high chromaticity and is included in a relatively thin character, since such factors suggest that the pixel is within a small, black character. In another example, the SEN signal is assigned a value of 0 (corresponding to 200 lines per inch resolution) in a case that the subject pixel is not near an edge and is included in a very thick area, since larger toner dots, which provide more toner per unit area than larger dots, generate a better halftone image.

As described above, line delay memory 108 delays the signals until the UCR, FILTER and SEN signals are generated by unit 113. Moreover, each pixel in the scanned document must be processed by unit 113. Accordingly, the above-described functions of elements 114 to 116 present a bottleneck to image processing speed.

It has therefore been contemplated to use software to perform the image processing functions of unit 113. However, conventional software implementations of these functions require extremely long processing times in comparison to hardware arrangements.

In view of the foregoing, what is needed is an image processing system which reduces processing time by reducing delays caused by hardware elements such as unit 113.

SUMMARY OF THE INVENTION

The present invention addresses the foregoing by utilizing results of block selection processing to determine software processes to be applied to pixel image data. By using the results of block selection processing, it can be determined whether a pixel should undergo significant processing, minimal processing or no processing at all. As a result, image processing is flexible and executable at speeds comparable to hardware-based processing.

Particularly, the present invention concerns a system in which pixel data of an image is input and block selection processing is performed on the pixel data to determine types of pixels within the pixel data. Next, it is determined, based on the block selection processing, if a pixel is in an object area of the image and, if the pixel is determined to be in an object area of the image a proximity of the pixel to an edge is detected. These features provide fast overall processing by detecting edge proximity only for those pixels which are determined to be in object areas of the image.

In related aspects, the invention also contemplates detection of pixel chromaticity and a width of a character including a pixel if the pixel is determined to be in an object area of the image.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
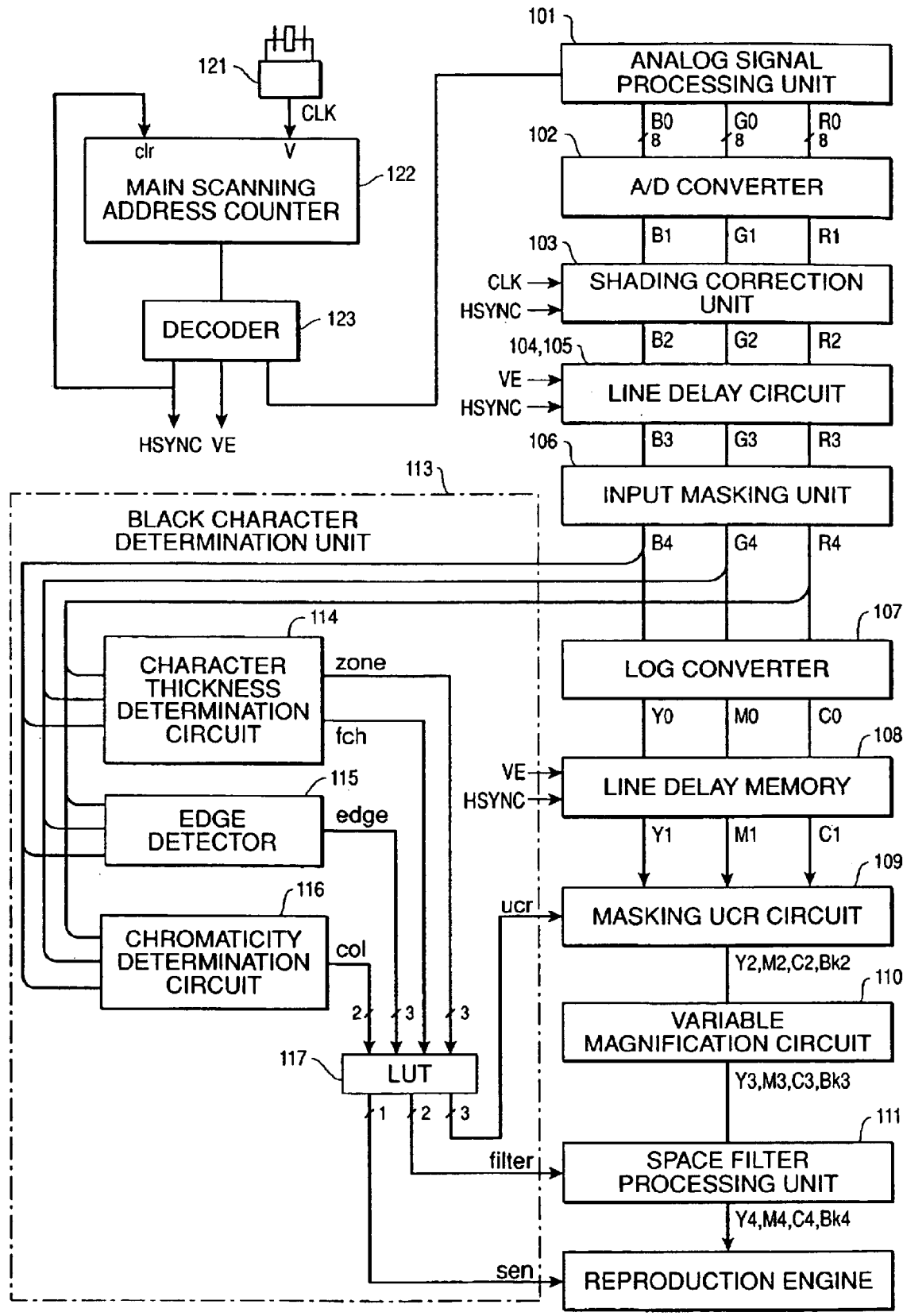
FIG. 1 is a block diagram showing a flow of an image signal within a conventional image processing unit.
Figure 2:
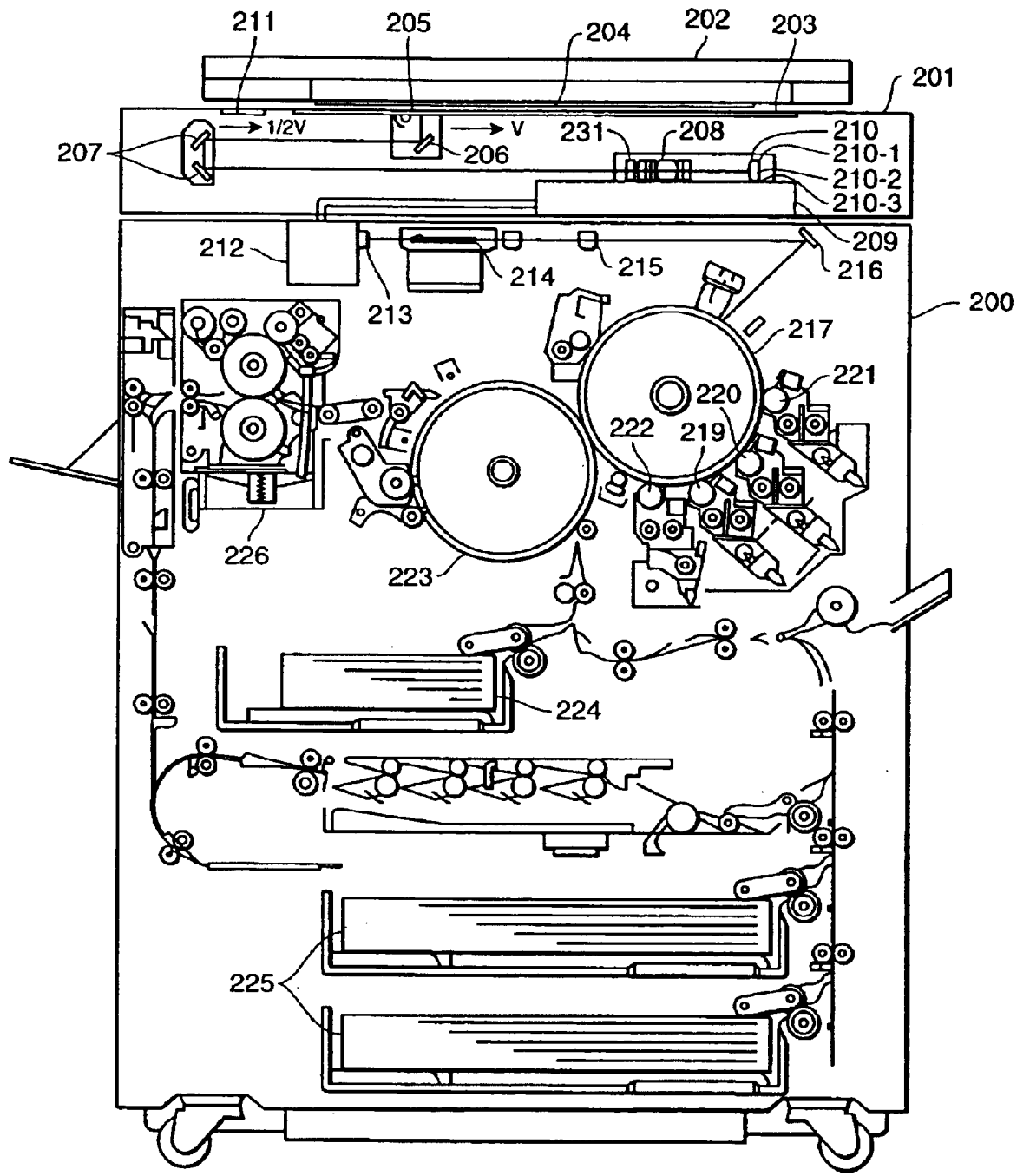
FIG. 2 is a sectional view of a color copier according to an embodiment of the present invention.

FIG. 2 shows a sectional view of an image processing apparatus according to one embodiment of the present invention. In the apparatus of FIG. 2, image scanner 201 reads an original document, and digitally processes read pixel data of the original document into digital signals. Printer 200 then prints out an image corresponding to the original document read by image scanner 201 on a printing sheet in full color.

In image scanner 201, original document 204 is set on a platen glass covered with a document cover 202, and exposed by halogen lamp 205. The reflected light from original document 204 is further reflected by mirrors 206 and 207, then focuses on CCD 210 for identifying R, G, and B signals after passing through the lens 208. It should be noted that lens 208 is covered by infrared filter 231.

In the preferred embodiment, each row of sensors in CCD 210 for reading respective color components is composed of 5000 pixels, thus CCD 210 can read across the shorter side of an A3-sized original, namely 297 mm, at 400 dpi resolution. CCD 210 separates color information of original document 204 into full-color information of R, G and B components, and converts the full-color information into color signals.

In addition, standard white board 211 generates correction data for correcting read data by R, G, B photo sensors 210-1 to 210-3 of CCD 210. Standard white board 211 has uniform reflection characteristics in the visible light range, and appears white. After correcting the data, CCD 210 then sends the signals to signal processing unit 209.

It should be noted that, halogen lamp 205 and mirror 206 move at speed v, and mirror 207 moves at speed (½)v in a perpendicular direction with respect to an electrical scanning direction of CCD 210 (a main scanning direction). The entire original document 204 is scanned in this manner. Further, in signal processing unit 209, the read signals produced by the scanner are electrically processed and separated into color components of magenta (M), cyan (C), yellow (Y), and black (Bk), then stored before being sent to printer 200.

In printer 200, each image signal of M, C, Y, and BK from image scanner 201 is sent to laser driver 212. Laser driver 212 drives semi-conductor laser 213 by signals modulated on the basis of the image signals. The laser beam scans electrostatic drum 217 via polygon mirror 214, f-θ lens 215, and mirror 216.

The developer unit is composed of magenta developer 219, cyan developer 220, yellow developer 221, and black developer 222. These four drums touch electrostatic drum 217, are configured to turn therewith, and develop latent images of M, C, Y and Bk formed on electrostatic drum 217 with the corresponding color toner. Further, transfer drum 223 attracts a paper sheet fed from paper cassette 224 or 225, and a toner image developed on electrostatic drum 217 is transferred onto the paper sheet. The paper sheet is then ejected after passing through fixing unit 226.

Figure 3:
FIG. 3 is a view of a document containing pixel data for processing according to the present invention.

FIG. 3 is a view of a document containing image data for processing according to the present invention. Shown in FIG. 3 is document 300, which contains several types of pixel data, including title data 301, text data 302, image data 304, line drawing data 305 and table data 306. Of course, any other document containing these or other types of pixel data can be processed according to the present invention: In this regard, FIG. 4 is a flow chart of process steps to process pixel data of a document according to the present invention.

Figure 4:
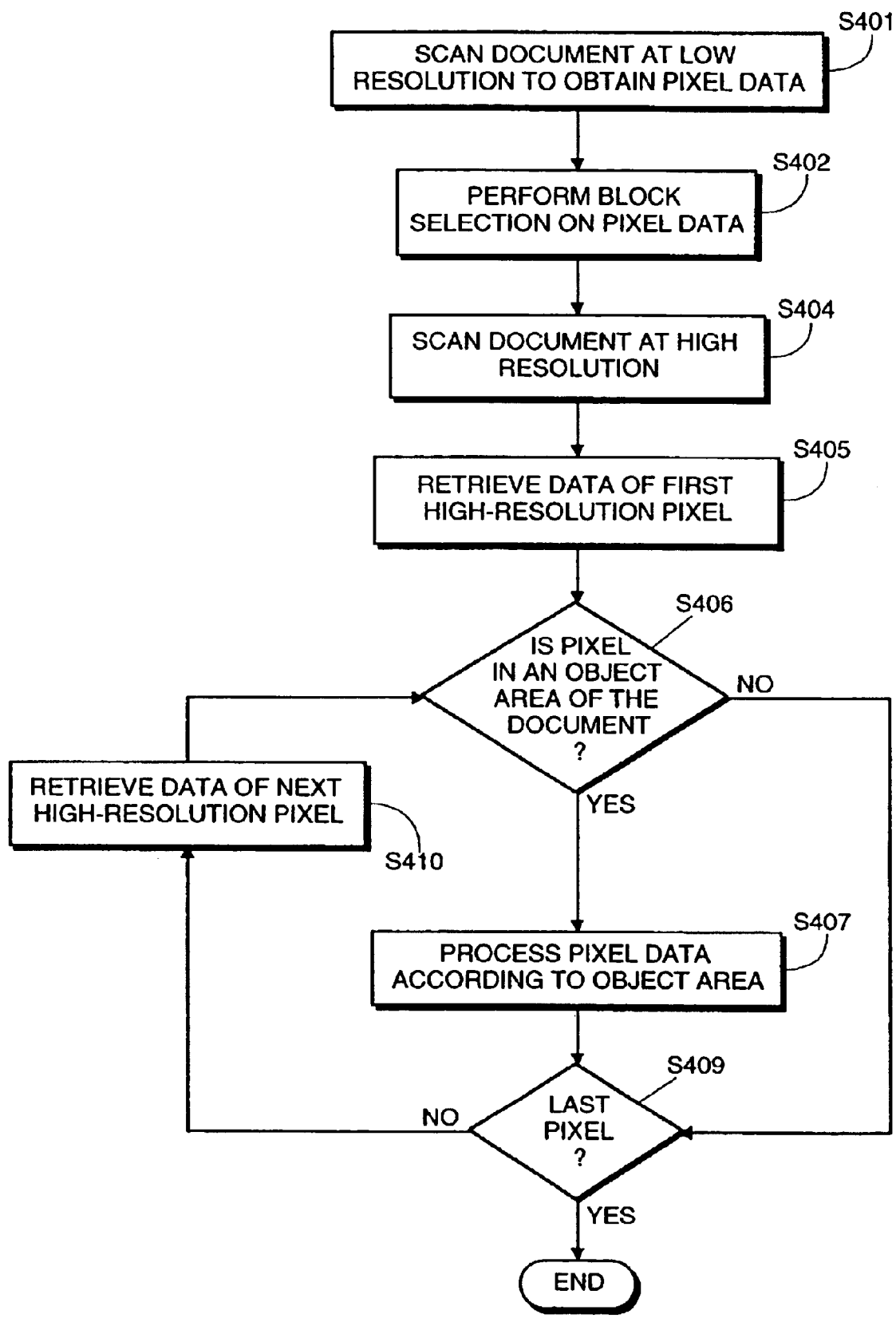
FIG. 4 is a flow chart of processor-executable process steps to process pixel data according to the present invention.

Generally, the FIG. 4 process steps involve input of pixel data of a document, performance of block selection processing on the pixel data to determine types of pixels within the image data, determination, based on the block selection processing, of whether a pixel is in an object area of the document, and processing of the pixel data according to the object area. Such processing may include detection of a proximity of the pixel to an edge, detection of a thickness of a character including the pixel, detection of chromaticity of the pixel, or the like.

Flow begins at step S401, wherein a document is scanned at a low resolution. As described above with respect to FIG. 2, such scanning is performed by image scanner 201 in the preferred embodiment. Of course, other systems for scanning a document can be used in step S401. The document is scanned at a low resolution in step S401 in order to reduce processing time, since low resolution scanning traditionally occurs more quickly then high resolution scanning. In addition, Applicant has discovered that low resolution pixel data provides satisfactory results when subjected to subsequent block selection processing.

Figure 5:
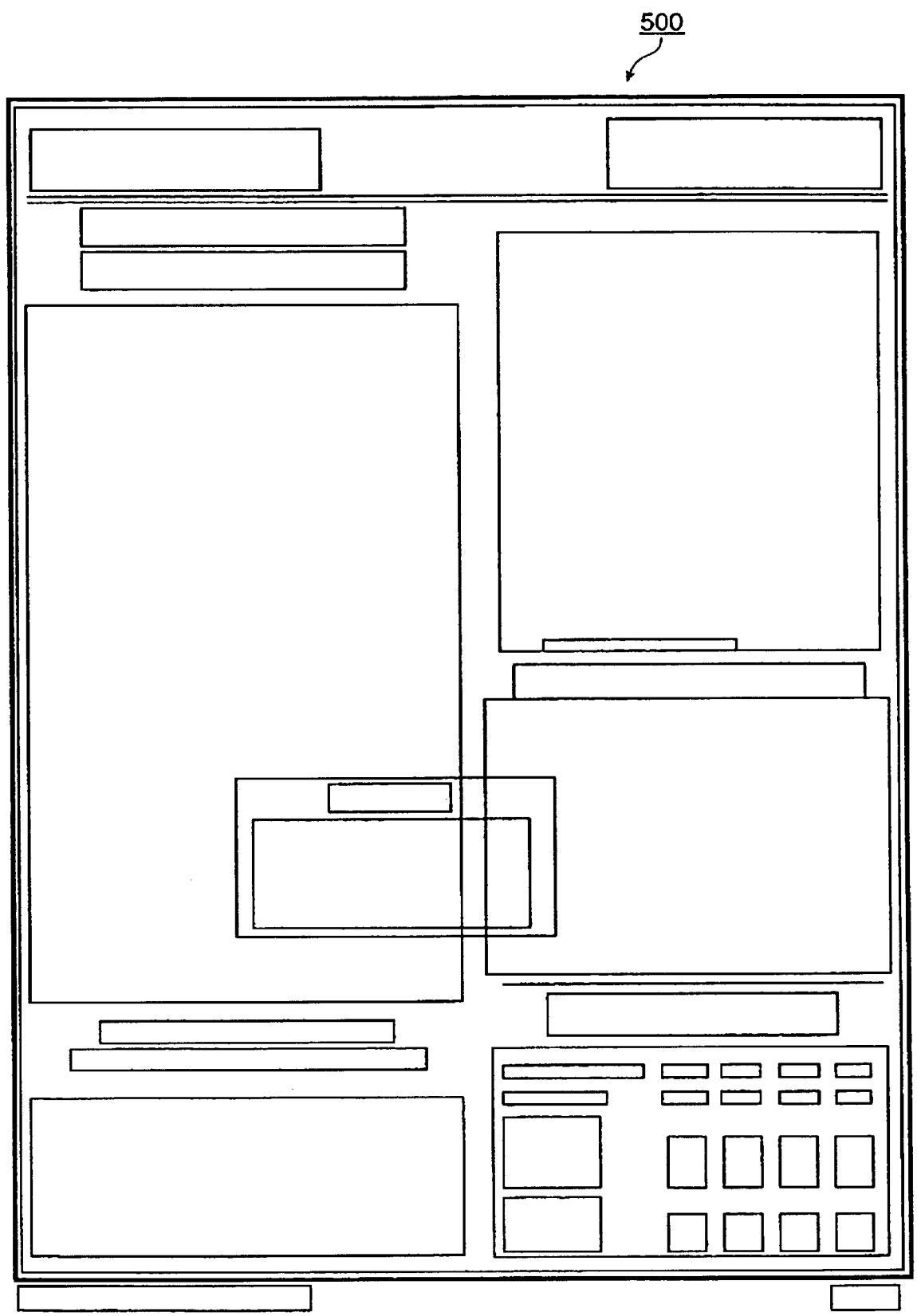
FIG. 5 is a representative view of object areas identified by block selection processing.

Accordingly, in step S402, block selection processing is performed on the pixel data to produce a "blocked" representation of the scanned document. Such a representation is shown in FIG. 5 as representation 500. Any conventional block selection (or page segmentation) technique can be utilized in step S402, including those described in the applications and patents listed above and incorporated by reference herein.

In general, block selection techniques identify areas within an image and assign attributes to the identified areas, such as picture, text, title, table, line drawing or the like. As described in the above-listed applications and patents, many other types of attributes may be assigned to the identified areas.

Next, in step S404, the document is scanned at a high resolution. The high resolution data is used to produce an output image, therefore high resolution data is preferable to low resolution data. In another embodiment of the invention, the document is scanned at high resolution at step S401 and converted to low resolution for subsequent performance of block selection processing in step S402 on the low resolution image. Accordingly, in this alternative embodiment, step S404 is not performed.

After a high resolution image is scanned in step S404 of the present embodiment, data of a first high-resolution pixel is retrieved in step S405. It is then determined in step S406 whether the retrieved pixel is in an object area of the document. In a preferred embodiment, only text areas are considered to be object areas. Of course, depending on a user's preference, line, line art, title or table areas may also be considered to be object areas. Also in the preferred embodiment, the determination in step S406 is performed by determining coordinates of the pixel and comparing those coordinates with blocked image areas such as those shown in representation 500. If the pixel coordinates are within the coordinates of a blocked area, the determination in step S406 is positive. Accordingly, flow proceeds to step S407 to process the pixel data according to the object area in which the pixel resides. As shown in FIG. 4, if, in step S406, it is determined that the retrieved pixel is not in an object area of the document, flow continues directly to step S409.

Pixel processing can proceed in many ways. In a preferred embodiment, the FIG. 4 steps are embodied in a module to provide functionality similar to unit 113. Accordingly, software methods can be applied to the "object area" pixels to provide functions similar to that provided by character thickness determination unit 114, edge detector 115 or chromaticity determination unit 116. Since only selected pixels are processed, delays caused by black character determination can be reduced in comparison to conventional systems. Of course, any other processing can be performed on the pixel in step S407.

In step S409, it is determined whether the pixel is a last pixel in the image. If not, flow proceeds to step S410. A next high resolution pixel is retrieved from step S410 and flow continues therefrom to step S406 as described above.

Finally, if it is determined in step S409 that a last retrieved pixel is the last pixel in the obtained pixel data, the FIG. 4 flow process steps terminate.

While the present invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. An image processing method, comprising:
   inputting pixel data of an image;
   performing block selection processing on the pixel data to determine types of pixels within the image;
   determining, based on the block selection processing, if a pixel is in an object area of the image; and
   selectively performing black character determination processing on the pixel, wherein black character determination is performed in a case that the pixel is determined to be in an object area of the image based on block selection processing.

2. A method according to claim 1, wherein the inputting step comprises:
   a pre-scanning step to input pixel data of a first resolution; and
   a scanning step to input pixel data of a second resolution, the second resolution higher than the first resolution, wherein the block selection processing is performed on the pixel data of the first resolution, and
   wherein the step of selectively performing black character determination processing is performed on the pixel data of the second resolution.

3. A method according to claim 2, wherein black character determination processing comprises one or more of detecting a thickness of a character including the pixel, detecting chromaticity of the pixel, and detecting proximity of an edge to the pixel.

4. A method according to claim 1, wherein the step of selectively performing black character determination processing is not performed in a case that the pixel is determined to be outside an object area of the image based on block selection processing.

5. Processor-executable process steps stored on a processor-readable medium, the process steps comprising:
   an inputting step to input pixel data of an image;
   a performing step to perform block selection processing on the pixel data to determine types of pixels within the image;
   a determining step to determine, based on the block selection processing, if a pixel is in an object area of the image; and
   a step of selectively performing black character determination processing on the pixel in a case that the pixel is determined to be in an object area of the image based on block selection processing.

6. Processor-executable process steps according to claim 5, wherein the step of inputting comprises:
   a pre-scanning step to input pixel data of a first resolution; and
   a scanning step to input pixel data of a second resolution, the second resolution higher than the first resolution,
   wherein the block selection processing is performed on the pixel data of the first resolution, and
   wherein the step of selectively performing black character determination processing is performed on the pixel data of the second resolution higher than the first resolution.

7. Processor-executable process steps according to claim 6, wherein the step of performing black character determination further comprises one or more of a detecting step to detect a thickness of a character including the pixel, a detecting step to detect chromaticity of the pixel, and a detecting step to detect proximity of an edge to the pixel.

8. Process-executable process steps according to claim 5, wherein the step of selectively performing black character determination processing is not performed in a case that the pixel is determined to be outside an object area of the image based on block selection processing.

9. An image processing apparatus, comprising:

means for inputting pixel data of an image;

means for performing block selection processing on the pixel data to determine types of pixels within the image;

means for determining, based on the block selection processing, if a pixel is in an object area of the image; and means for selectively performing black character determination processing on the pixel in a case that the pixel is determined to be in an object area of the image based on block selection processing.

10. An apparatus according to claim 9, wherein the means for inputting comprises:

means for pre-scanning input pixel data of a first resolution; and means for scanning pixel data of a second resolution, the second resolution higher than the first resolution, wherein the block selection processing is performed on the pixel data of the first resolution, and wherein the means for selectively performing black character determination processing processes the pixel data of the second resolution higher than the first resolution.

11. An apparatus according to claim 10, wherein the means for performing black character determination processing further comprises one or more of a means for detecting a thickness of a character including the pixel, a means for detecting chromaticity of the pixel, and a means for detecting proximity of an edge to the pixel.

12. An image processing apparatus according to claim 9, wherein the means for performing black character determination processing does not process the pixel in a case that the pixel is determined to be outside an object area of the image based on block selection processing.

* * * * *